United States Patent [19]
Johnson et al.

[11] Patent Number: 5,303,064
[45] Date of Patent: Apr. 12, 1994

[54] IMAGE SCANNER WITH CALIBRATION MECHANISM TO OBTAIN FULL DYNAMIC RANGE AND COMPENSATED LINEAR OUTPUT

[76] Inventors: Kent Johnson, 1038 Neilson St., Albany, Calif. 94706; Lynn L. Ackler, 864 Walnut St., Alameda, Calif. 94501; David C. Jenkins, 5406 Ridge Park Dr., Loomis, Calif. 95650; Howard H. Barney, 2237 Carleton St., Berkeley, Calif. 94703; Chris A. Brooks, 1801 Clement Ave., Bldg. 27, Alameda, Calif. 94501

[21] Appl. No.: 658,177

[22] Filed: Feb. 20, 1991

[51] Int. Cl.[5] .............................................. H04N 1/46
[52] U.S. Cl. ..................... 358/406; 358/504; 358/512; 358/483; 358/513; 358/520; 358/479
[58] Field of Search ................. 358/406, 76, 479, 482, 358/483, 487, 213.15, 213.16, 213.18, 213.19, 213.27, 213.28, 213.31, 446, 512, 504, 513, 514, 518, 520; H04N 1/46

[56] References Cited

U.S. PATENT DOCUMENTS

| | | | |
|---|---|---|---|
| 4,307,423 | 12/1981 | Atherton | 358/213.15 |
| 4,589,034 | 5/1986 | Yokomizo | 358/483 |
| 4,694,356 | 9/1987 | Constable | 358/527 |
| 5,144,448 | 9/1992 | Hornblower, III et al. | 358/483 |
| 5,153,421 | 10/1992 | Tandon et al. | 358/213.16 |

Primary Examiner—Edward L. Coles, Sr.
Assistant Examiner—Jill Jackson
Attorney, Agent, or Firm—Flehr, Hohbach, Test, Albritton & Herbert

[57] ABSTRACT

A calibrated scanner is disclosed. The calibrated scanner includes a sensor board with a Charge Coupled Device (CCD) having two output signals. The sensor board also includes two offset devices, a coarse offset and a fine offset, the coarse offset being connected to the two output signals, the fine offset being connected to one of the output signals. The offsets are adjusted to provide a nonclipping DC bias for the two output signals. The sensor board also includes two gain devices, one gain device being attached to each output signal. The gain devices are adjusted to balance the two output signals. After these adjustments, the saturation level of the CCD is determined. The saturation level information is then used in readjusting the gain and offset devices. After this calibration, a linear correction may be applied to the output signal of the sensor board. The linear correction is accomplished by determining dark and light values of the sensor board. These values, along with ideal dark and light values, are used to solve two linear equations to determine M and b values. The M and b values are then used to provide direct linear correction to the data leaving the sensor board.

12 Claims, 11 Drawing Sheets

IMAGE SCANNER WITH CALIBRATION MECHANISM TO OBTAIN FULL DYNAMIC RANGE AND COMPENSATED LINEAR OUTPUT

BRIEF DESCRIPTION OF THE INVENTION

This invention relates to scanners which scan film and generate digital data representing the film's image. More particularly, this invention relates to a scanner which utilizes a calibration procedure to obtain optimal digital data of a scanned image.

BACKGROUND OF THE INVENTION

A number of difficulties are associated with image scanner technology. Specifically, the transformation of an analog signal of the image into a digital signal of the image is accompanied by a number of difficulties. First, the analog signal is subject to variation with heat, humidity, and other external factors which affect the quality of the resultant digital data. Next, the analog signal includes a noise portion which is transferred into the digital signal in the absence of proper processing. Another problem with analog signal manipulation in slide scanners is the saturation of analog devices within the scanner. These problems often result in a signal which includes erroneous data in a non-linear form. To correct this data requires a great deal of processing power.

By calibrating the sensor board, or analog electronics, on a scanner, an improved signal may be obtained. As a result, subsequent signal processing is reduced, therefore a smaller processor may be employed.

Calibration of a scanner is difficult since many elements associated with the scanner have interdependent relationships. Thus, adjusting one element will result in changes to other elements. Prior art attempts at calibrating scanners have relied upon a one-pass approach to calibrating elements.

OBJECTS AND SUMMARY OF THE INVENTION

Thus it is a primary object of the present invention to provide a calibrated image scanner.

It is a related object of the present invention to provide a scanner which is calibrated to increase the dynamic range of the resultant image.

It is still another object of the present invention to provide a scanner which minimizes the analog manipulation of the image data.

It is another object of the present invention to provide a scanner which includes a method for correcting the resultant signal to obtain a linear response.

It is yet another object of the present invention to provide a scanner which operates below the saturation level of its analog devices.

It is another object of the present invention to provide a scanner which calibrates itself through an iterative procedure.

These and other objects are obtained by a calibrated scanner in accordance with the present invention. The calibrated scanner includes a sensor board, or analog electronics, with a Charge Coupled Device (CCD) having two output signals. The sensor board also includes two offset devices, a coarse offset and a fine offset, the coarse offset being connected to the two output signals, the fine offset being connected to one of the output signals. The offsets are adjusted to provide a non-clipping DC bias for the two output signals. The sensor board also includes two gain devices, one gain device being attached to each output signal. The gain devices are adjusted to balance the two output signals. After these adjustments, the saturation level of the CCD is determined. The saturation level information is then used in readjusting the gain and offset devices. After this calibration, a linear correction may be applied to the output signal of the sensor board. The linear correction is accomplished by determining dark and light values of the sensor board. These values, along with ideal dark and light values, are used to solve two linear equations to determine M and b values. The M and b values are then used to provide direct linear correction to the data leaving the sensor board.

BRIEF DESCRIPTION OF THE DRAWINGS

Other objects and advantages of the invention will become apparent upon reading the following detailed description and upon reference to the drawings, in which.

DETAILED DESCRIPTION OF THE INVENTION

Figure 1:
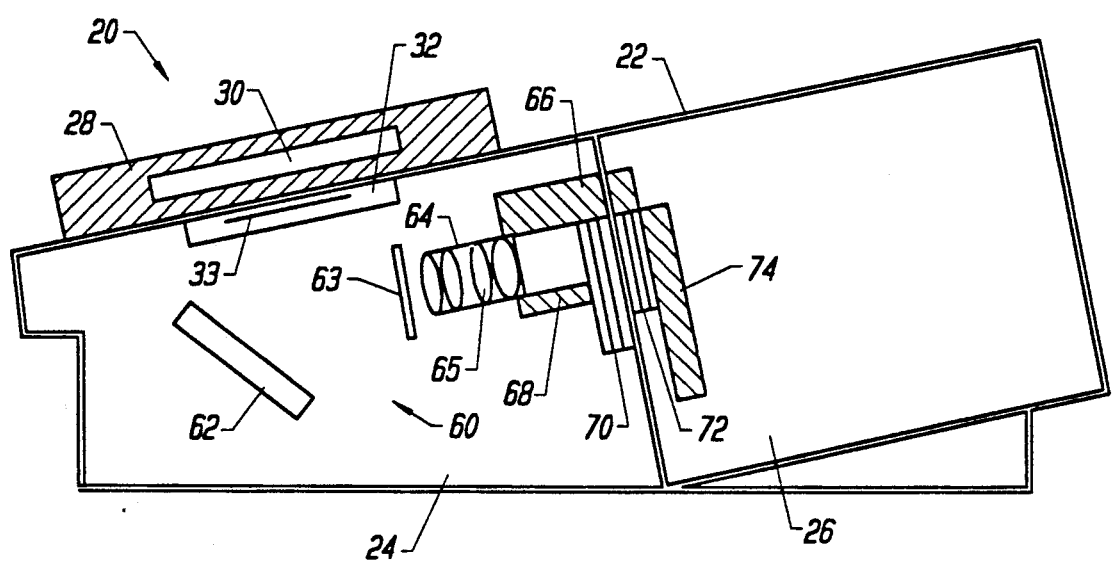
FIG. 1 is a side cross-sectional view of a scanner which may be used in accordance with the present invention.

Turning now to the drawings, wherein like components are designated by like reference numerals in the various figures, attention is initially directed to FIG. 1. Depicted therein is a cross sectional view of a slide scanner 20 in accordance with a preferred embodiment of the present invention. Slide scanner 20 includes a housing 22 with an optical region 24 and an electronics region 26. A door 28 is positioned on the housing 22 above the optical region 24. The door includes a light source 30 and provides access to a film carriage 32. Film 33 is placed in film carriage 32. The film carriage 32 transports the film 33 across the optical assembly 60, in accordance with prior art techniques.

The optical assembly 60 receives the image from the film 33 as illuminated by light source 30. The image projected by light source 30 is reflected from mirror 62 into infrared filter 63 and into lens assembly 64, which includes a plurality of lenses 65. From the lens assembly 64, the image passes through a filter of the RGB filter assembly 70. The filter assembly 70 positions either a red, green, or blue filter in the light path, as is known in the art. After being filtered, as described, the image impacts upon sensor 72, which comprises a plurality of photosites (or sensors). Sensor 72 is coupled to sensor board 74.

Preferably, a zoom assembly 66 allows the lens assembly 64 and sensor 72 to move in reference to film 33. Analogously, focus assembly 68 preferably allows the lens assembly 64 to move in reference to sensor 72. Methods known in the art may be utilized to construct zoom assembly 66 and focus assembly 68. As a result, the optical assembly 60 may be adjusted to accommodate a variety of film sizes. Table I provides data defining an optimal configuration of optical assembly 60 for various film sizes.

TABLE I

|  |  |  |  |
|---|---|---|---|
| Lens Width | | 32 mm | |
| Focal Length | | 65 mm | |
| F-Number | | 4.5 | |
| Resolution | | 100 line pairs/mm | |
| Film Size | 35 mm | 2.25 mm × 2.25 mm | 4" × 5" |
| Object to Image | 268 mm | 327 mm | 472 mm |
| Object to Lens | 132 mm | 218 mm | 375 mm |
| Lens to Image | 104 mm | 78 mm | 65 mm |
| Image Length | 19.6 mm | 21.6 mm | 19.5 mm |
| Object Length | 24.9 mm | 54.9 mm | 99.1 mm |

The folded configuration of the optical assembly 60 allows for a compact scanner 20. The door 28 allows for easy access to the film carriage 32. Since only the film carriage 32 moves during scanning (while the light source 30, lens assembly 64, and mirror 62 remain stable), jitter and other problems are reduced.

Figure 2:
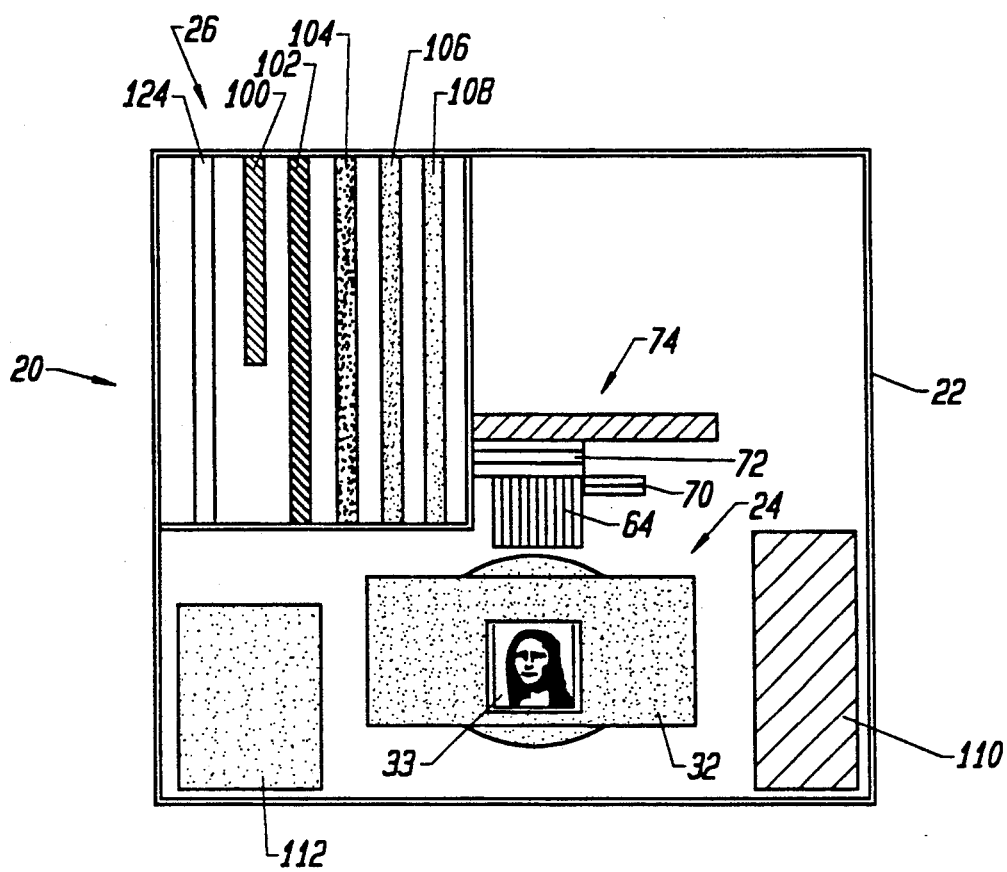
FIG. 2 is top cross-sectional view of the scanner of FIG. 1.

Turning to FIG. 2, depicted therein is a top view of scanner 20. Electronics region 26 preferably includes serial board 100, SCSI board 102, Digital Signal Processing (DSP) board 104, motor board 106, CPU board 108, and hard disk controller 124. The figure also depicts lamp power supply 110 and hard disk 112. Preferably, a power supply 144 is positioned beneath the different boards in the electronics region 26.

Figure 3:
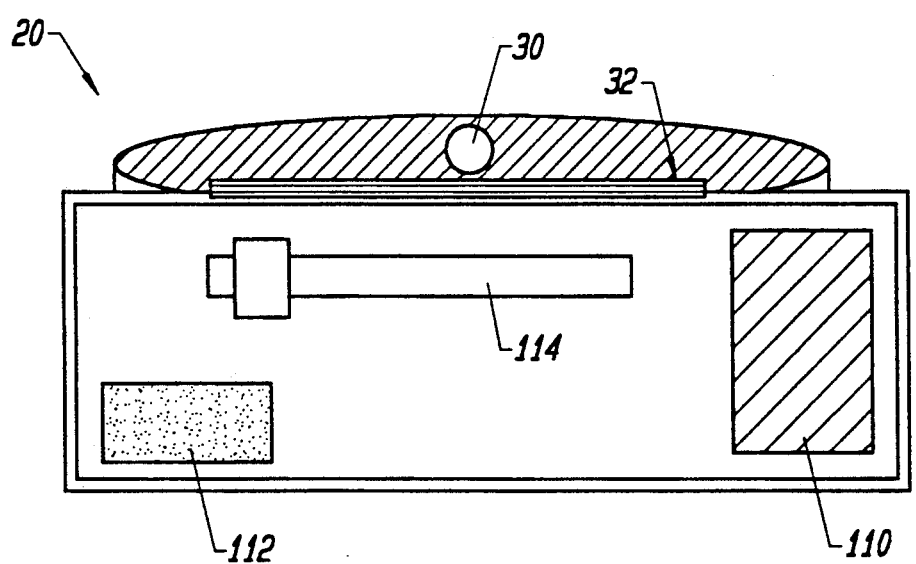
FIG. 3 is a front cross-sectional view of the scanner of FIG. 1.

Another view of scanner 20 is provided in FIG. 3. FIG. 3 is a front view of the scanner, which in addition to showing previously described elements, also depicts linear encoder 114, as to be more fully described herein.

Returning to FIG. 2 and the elements depicted therein, the serial board 100 is a half-slot board which provides means for directly controlling the scanner activity by sending low level commands from a terminal emulator. This direct control of the scanner is useful for debugging. The presence of this board is preferable, it is not required for the scanner 20 to operate under normal conditions.

SCSI board 102 preferably includes a NCR 53C94 chip and a floppy disk interface. The SCSI board 102 is the communications link between the scanner 20 and the host computer 130, as to be more fully described.

The DSP board 104 preferably includes a Motorola 56001 DSP digital signal processor (image processor) 76. This processor performs a variety of operations in real-time on the pixel data coming from the sensor board 74, including gamma correction, light source compensation, and image resizing. The RAM is used as a buffer for the pixel data and for downloaded lookup tables. The board 104 preferably includes circuitry which controls exposure timing.

Figure 4:
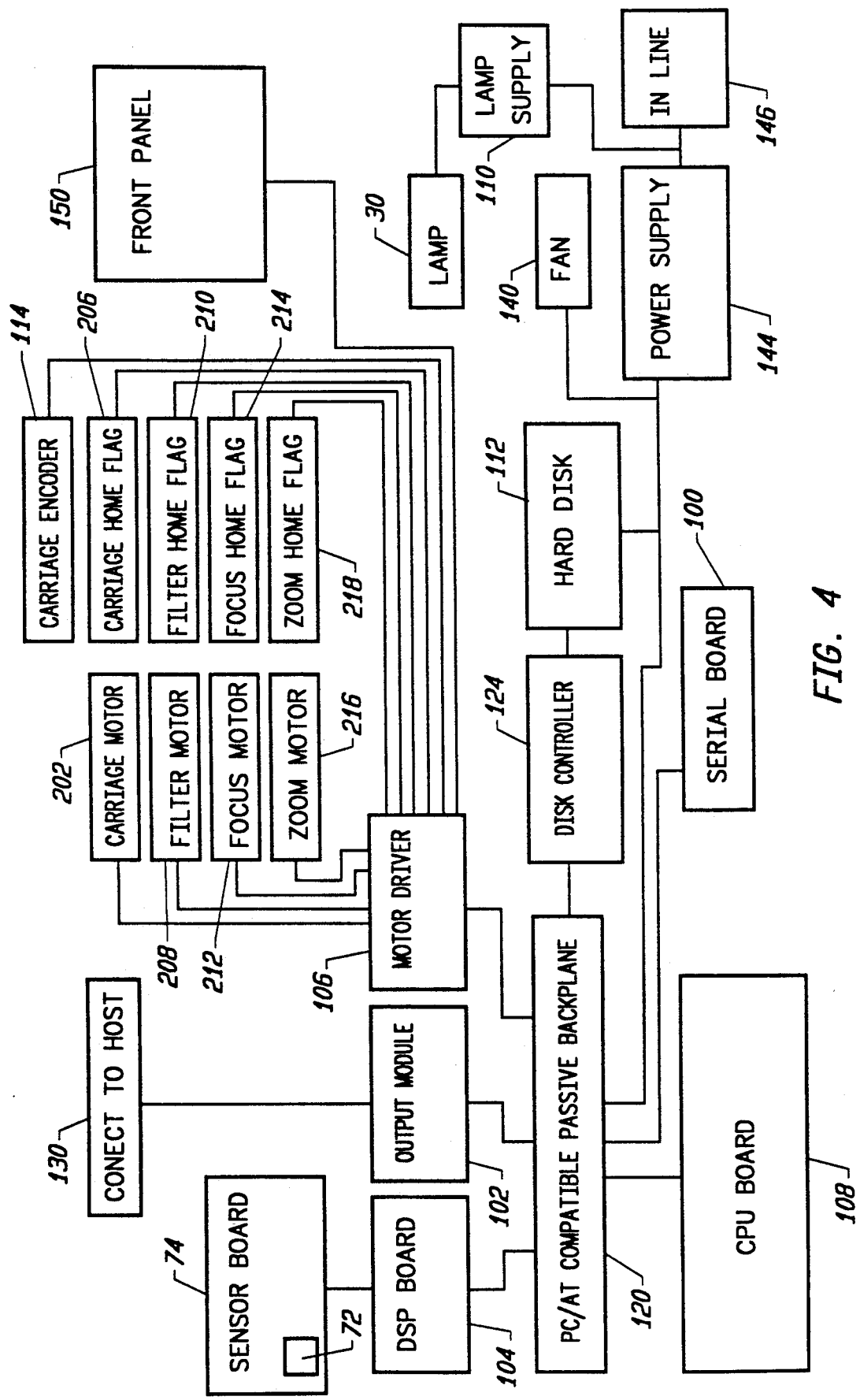
FIG. 4 is a block diagram of scanner electronics which may be utilized in accordance with the present invention.

The motor board 106, more fully depicted in relation to FIG. 4, includes DC servo control circuitry for the carriage motor 202 (for film carriage 32), and control circuitry for the three stepper motors: filter motor 208 (for filter assembly 70), focus motor 212 (for focus assembly 68), and zoom motor 216 (for zoom assembly 66). The board 106 also has interrupt circuits for each of the four home position flag sensors (carriage 206, filter 208, focus 212, and zoom 218). The alphanumeric front panel liquid crystal display 150 is also connected to circuitry on the motor board 106.

The CPU board 108 preferably includes a 16 MHz, 80386 processor, 8 MB of RAM, interrupt controller, DMA controller, and bus interface circuitry. The system software running on the CPU initiates and/or controls all activity in the scanner.

Power supply 144 preferably provides a number of DC voltages (+5 volt, +/−12 volts, and +/−15 volts) used by the PC boards and motors. Lamp supply 144, as seen in FIG. 4, provides power for the fluorescent lamp (light source) 30. Preferably, a photodetector at the lamp 30 measures the light intensity and feeds a signal proportional to the intensity back to the lamp power supply 144. This feedback circuit is used to adjust the drive signal from the supply so that a constant light intensity is maintained.

FIG. 4 provides, in block form, a depiction of the scanner electronics. Many of the elements have been previously discussed, for instance, the DSP board 104. The DSP board 104 is connected to sensor board 74. Preferably, the sensor board 74 includes a CCD sensor 72 which includes 2592 sensors (photosites); a Fairchild CCD 181M-4 is sufficient for this purpose.

DSP board 104 is also coupled to backplane 120 which is coupled to CPU board 108. Backplane 120 may be any PC/AT compatible passive backplane, preferably with six slots. Backplane 120 is also coupled to a host computer 130 through output module (SCSI board) 102. Preferably, the host computer 130 is manufactured by Apple Computer, Cupertino, Calif., and the output module 102 is a SCSI interface, such as a NCR 53C94 chip. Backplane 120 also interacts with serial board 100.

Lamp supply 110 and power supply 144 are connected to input line power 146. Power supply 110 drives fan 140. Lamp power supply 144 is coupled to lamp (light source) 30.

Backplane 120 is coupled to disk controller 124 which is coupled to hard disk 112. Preferably, hard disk 112 is a Quantum ProDrive 40 AT and disk controller 124 is a Quantum ProDrive AT-Bus Adapter.

Finally, backplane 120 is coupled to motor driver (motor board) 106 which controls a number of motor operations in the scanner 20. Motor board 106 controls carriage motor 202 which drives film carriage 32. Linear encoder, or carriage encoder, 114 is also coupled to motor board 106. Carriage home flag 206 generates an interrupt signal when the film carriage 32 reaches a designated home position.

More specifically, carriage motor 202 operates in conjunction with film carriage 32 in the following manner. The carriage 32 moves the transparency 33, positioned in a film holder, past the light source 30 during a scan. The carriage 32 preferably moves along a threadless leadscrew. A pulley belt connects the leadscrew to carriage motor 202 which is mounted below the film carriage 32. Preferably, linear encoder 114, in accordance with the prior art, produces two sine wave output signals which are 90° out of phase. The circuitry on the motor board 106 converts these sinusoidal signals to digital square waves with a 50% duty cycle. The resultant square waves go into a quadrature decoder circuit which serves as an 8-bit relative position counter for the carriage 32.

Filter motor 208 drives filter assembly 70 which is capable of moving clear, red, green, and blue filters into the light path. The filter home flag 210 generates an interrupt signal when the filter reaches a designated home position.

Focus motor 212 moves focus assembly 68 such that the distance from the lens assembly 64 to the sensor 72 is adjusted. Focus motor 212 drives a pulley belt that is attached to a leadscrew which operates in conjunction with focus assembly 68. The focus home flag is activated when the focus assembly 68 is positioned closest to the sensor 72.

Zoom motor 216 controls the movement of zoom assembly 66. Specifically, the zoom motor 216 moves both the lens assembly 64 and sensor 72 in relation to film 33. Zoom motor 216 drives a pulley belt attached to a leadscrew.

Motor board 106 is also coupled to front panel 150 which may be an LCD which provides status information regarding the scanner 20.

Figure 5:
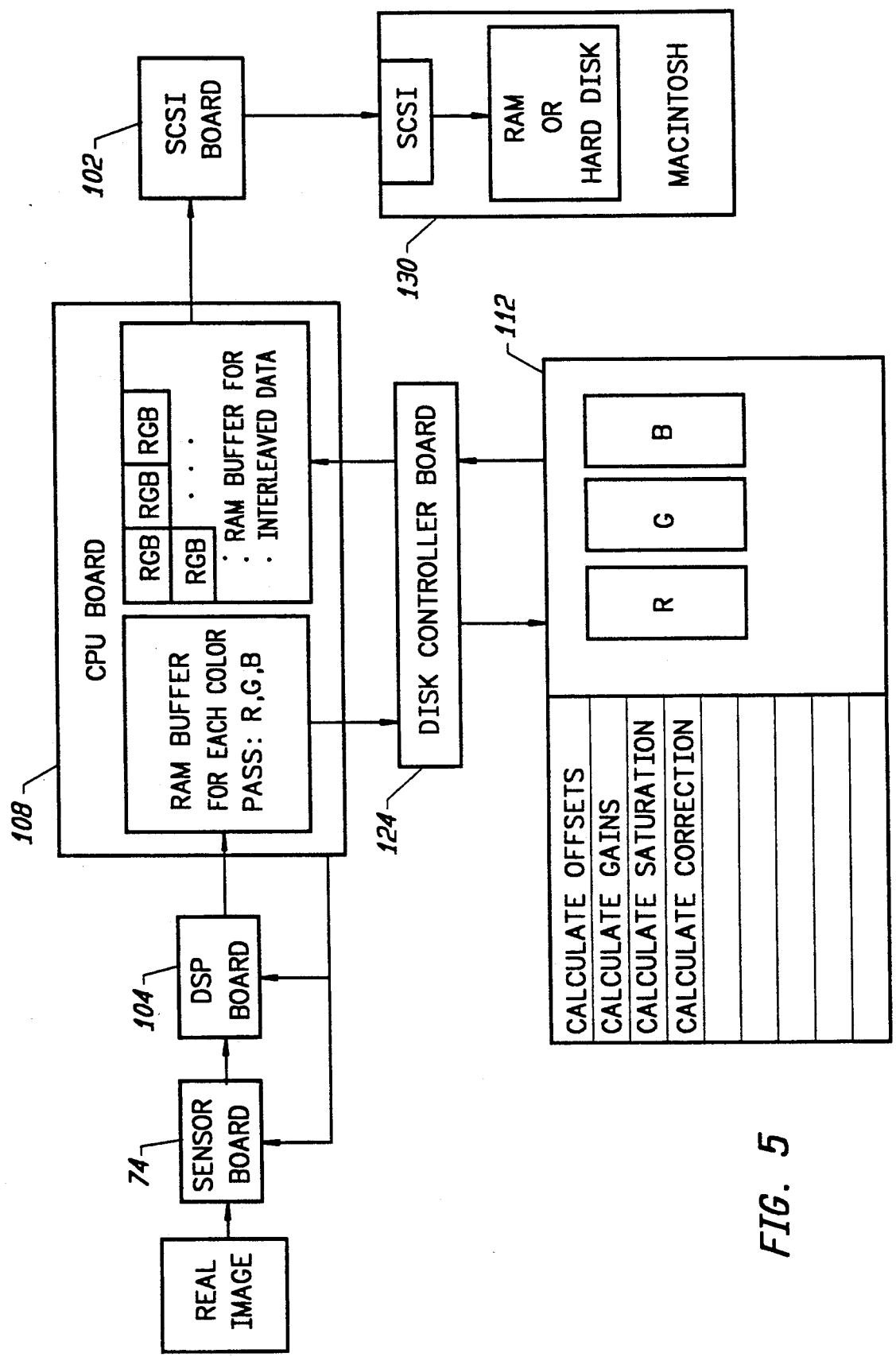
FIG. 5 is a block diagram of the data flow within a scanner utilized in accordance with the present invention.

Turning now to FIG. 5, a block diagram is provided to demonstrate how the scanner 20 of the present invention is utilized. Each of the three color planes of the image from the film 33 is conveyed through the optical assembly 60 and impinges upon sensor board 74. Sensor board 74 processes the data, as to be more fully described herein, and conveys the data, in digital form, to data signal processing board 104. The DSP board 104 further processes the signal and conveys it to CPU board 108 which includes a RAM buffer capable of storing one color plane. Through disc controller board 124, each color plane is stored on hard disk 112. Hard disk 112 also includes a number of programs which are called by the CPU board 108 and control the sensor board 74 and the data processing. After each color plane has been stored on hard disk 112, it is again conveyed through disk controller board 124 to the CPU board 108 where the individual color planes are interleaved, pixel by pixel, to form full color image data. This data is then conveyed to SCSI board 102 which conveys it to host computer 130. Host computer 130 may then manipulate the image data and integrate it with other data.

Figure 6:
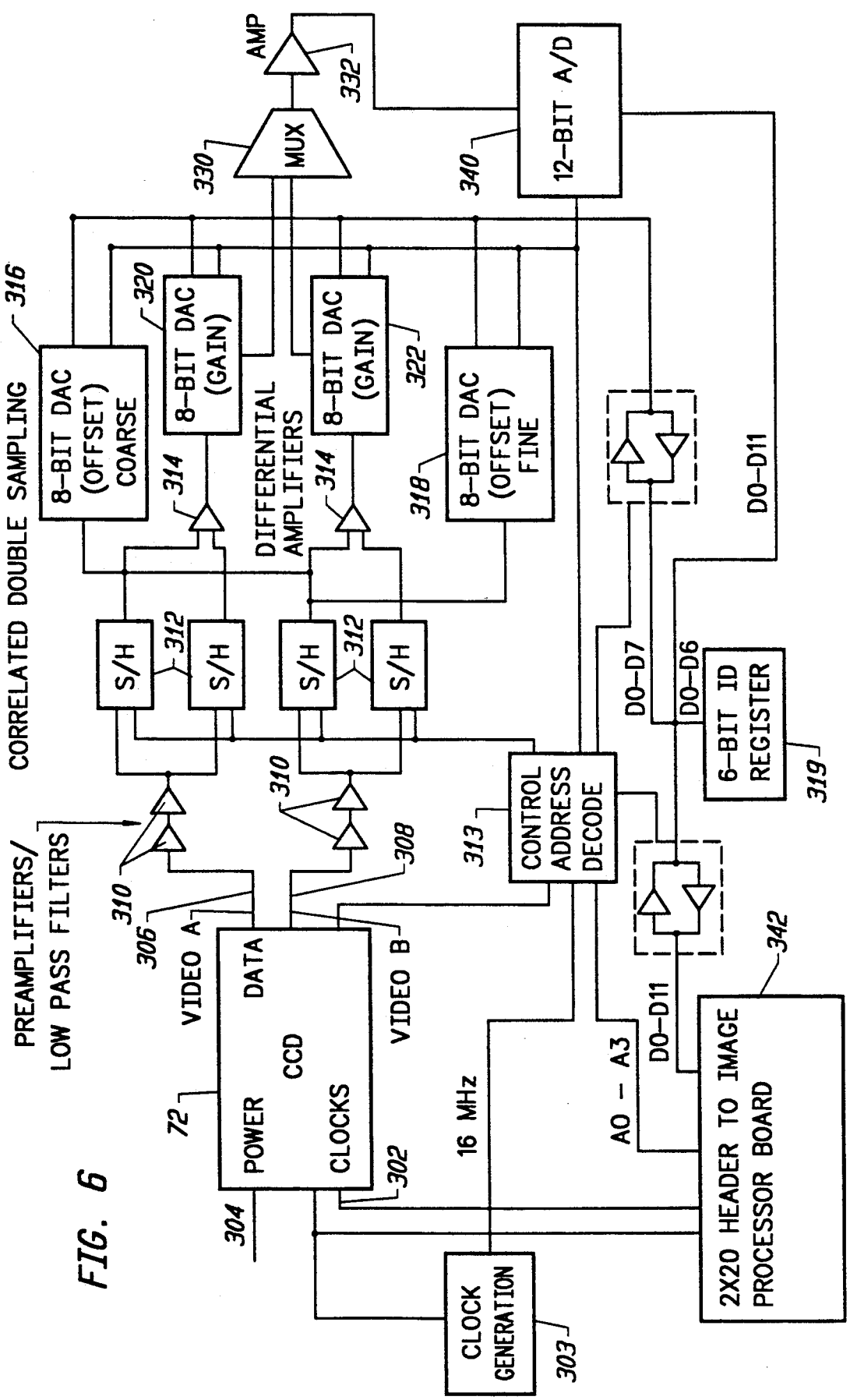
FIG. 6 is a schematic view of a sensor board of a scanner which may be employed in accordance with the present invention.

Turning now to FIG. 6, disclosed therein is a block diagram of sensor board 74, also referred to herein as analog electronics. Preferably, Charge Coupled Device (CCD) 72 includes a clock input 302 and a power input 304. One clock input 302 is coupled to clock 303 while another clock input is coupled to header 342 which serves as an interface between the sensor board 74 and the DSP board 104. The DSP board 104 generates an integration pulse which controls the exposure time.

CCD 72 drives first data channel output (video A) signal 306 and second data channel output (video B) signal 308. The video A 306 signal represents the pixel value, or pixel response to light of one half of the pixels. That is, film 33 is divided into a plurality of pixel values, bytes of data, which are individually interpreted by sensor board 74. The video B signal 308 represents the pixel value of the other half of the pixels.

The remainder of the circuit 74 serves to equalize the two channels (video A 306, video B 308) in order to obtain corrected pixel valves. That is, by equalizing the two channels, a pixel value which is not affected by variables such as temperature drift and noise may be obtained. Thus, the resultant pixel (read at analog to digital converter 340) has an enhanced dynamic range in the image.

Preferably, preamplifiers 310 boost and filter the respective signals. The signals are then conveyed to sample-and-hold devices 312 which are controlled by control means 313. The signals are then fed to differential amplifiers 314. Preferably, the inputs to the differential amplifiers 314 are modified by a coarse offset 316 and a fine offset 318. The coarse offset 316 is used to get a rough zero DC bias on both channels so that there are not any signals below ground. The fine offset 318 only feeds into the video B signal 308; it is used to balance the dark levels of the two channels. Both offsets preferably utilize an 8-bit digital to analog converter coupled to the DSP board 104. This feature enhances the digital control of the analog signal. If the coarse offset 316 and fine offset 318 are correctly adjusted, then an approximately flat signal at a zero DC offset will result when the sensors 72 are exposed to black.

Preferably, the outputs from the differential amplifiers 314 are conveyed to A gain element 320 and B gain element 322. The gain elements 320 and 322 include 8-bit digital to analog converters, again providing digital control of the analog signal. The video signals serve as the reference voltages. The gain elements (320, 322) serve to balance the light end of the two channels. In other words, if the sensors 72 were exposed to the bare light source 30, there should be no perceptible difference between the two signals (306, 308).

From the gain devices, the signals are preferably fed to multiplexer 330. The single signal output then passes through amplifier 332 and into an analog-to-digital converter 340. The resultant digital signal is conveyed to header 342 and eventually to DSP board 104. Thus, the sensor board 74 includes digital control of the analog data. In addition, analog manipulation of the signals is minimized as the analog signals are quickly transformed to a digital signal.

A preferable embodiment of a scanner 20 to be used in accordance with the present invention has now been provided. The calibration of this scanner for optimal performance will now be disclosed.

When the scanner 20 of the present invention is turned on it proceeds through the same power-on boot sequence as any DOS computer. Initially, memory and attached devices are diagnostically checked; afterwards, the operating system is loaded into memory, finally the system software including calibration instructions, is loaded into memory and begins execution. Preferably, the system software first initializes the output module 102 and the image processor 104. The software then directs the carriage motor 202, filter motor 208, focus motor 212, and zoom motor 216 to their home positions and assumes a ready state, waiting for commands from the host computer 130 via output module 102.

Typically, calibration of the scanner 20 begins at this point. The calibration of the scanner 20 may involve all of the steps described herein or only a few of the steps.

Preferably, the calibration of the scanner 20 is repeated for each resolution value utilized on the scanner 20.

Figure 7:
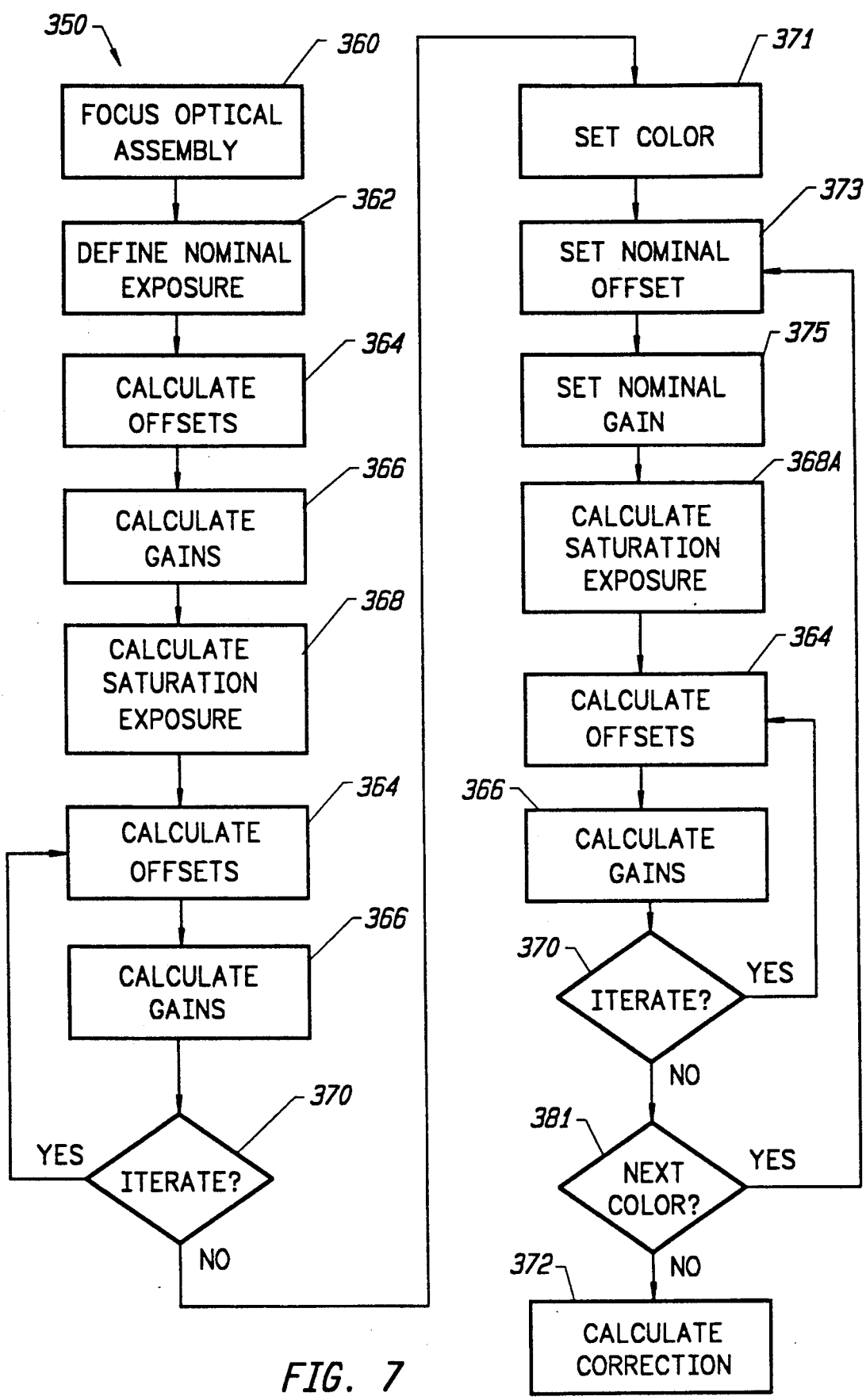
FIG. 7 is a flow diagram of the calibration method of the present invention.

The steps of the calibration method 350 of the present invention are generally disclosed in relation to FIG. 7. Preferably, the optical assembly is initially focused (block 360). Afterwards, a nominal exposure time for white light is defined for preliminary calibration scans (block 362). Using this nominal exposure, offsets (coarse offset 316; fine offset 318) for the sensor board 74 are calculated (block 364) and then gains (A gain 320; B gain 322) for the sensor board 74 are calculated (block 366). A saturation exposure level of the CCD 72 is then calculated (block 368). Using this saturation information, offsets and gains are recalculated (blocks 364 and 366). The offsets and gains may be refined through iteration, if desired (block 370).

After any desired iteration, an analogous method is followed using the different color filters of filter assembly 70. First, a color is set (block 371). Afterwards, a nominal offset (block 373) is established; this nominal offset may be the same as the calculated offset from step (364). Analogously, a nominal gain is established (block 375). The saturation exposure for the given color is then established (block 368A). This method is identical to the method described in relation to FIG. 11, except the saturation of analog-to-digital converter 340 is being measured, not the saturation of the CCD 72. Calculation of the offsets (block 364) and calculation of the gains (block 366) is then undertaken in light of the saturation exposure information. This process may be refined through iteration (decision block 370).

After this iterative procedure, the next color on the filter assembly 70 (decision block 381) is invoked and the procedure is reinitiated by setting nominal offsets (block 373) for the new color. After all colors have been tested (decision block 371), a correction is calculated (block 372).

In relation to the first step (block 360) of the calibration sequence 350, the optical assembly 60 is focused in the following manner. A slide 33, preferably with horizontal black and white lines, is placed in carriage 32. Optical assembly 60 receives the signal from the slide 33, then sensor board 74 and DSP board 104 interpret the signals. The sharpness of the pixel data is measured using prior art methods.

After preliminary readings, focus assembly 68 is repositioned and new data is received by sensor board 74. This process is repeated until the largest difference or greatest sharpness between elements is obtained, indicating that the slide 33 is in focus.

The next step in the calibration sequence 350 is to define a nominal exposure (block 362). The exposure time—the time the sensors 73 are exposed to light source 30 before CCD 300 is read—varies roughly between 40 and 300 milliseconds. The host computer 130 uses an arbitrary scale from 100 (minimum) to 500 (maximum) to define the exposure range. A nominal exposure of 300 may be selected at this juncture.

Figure 8:
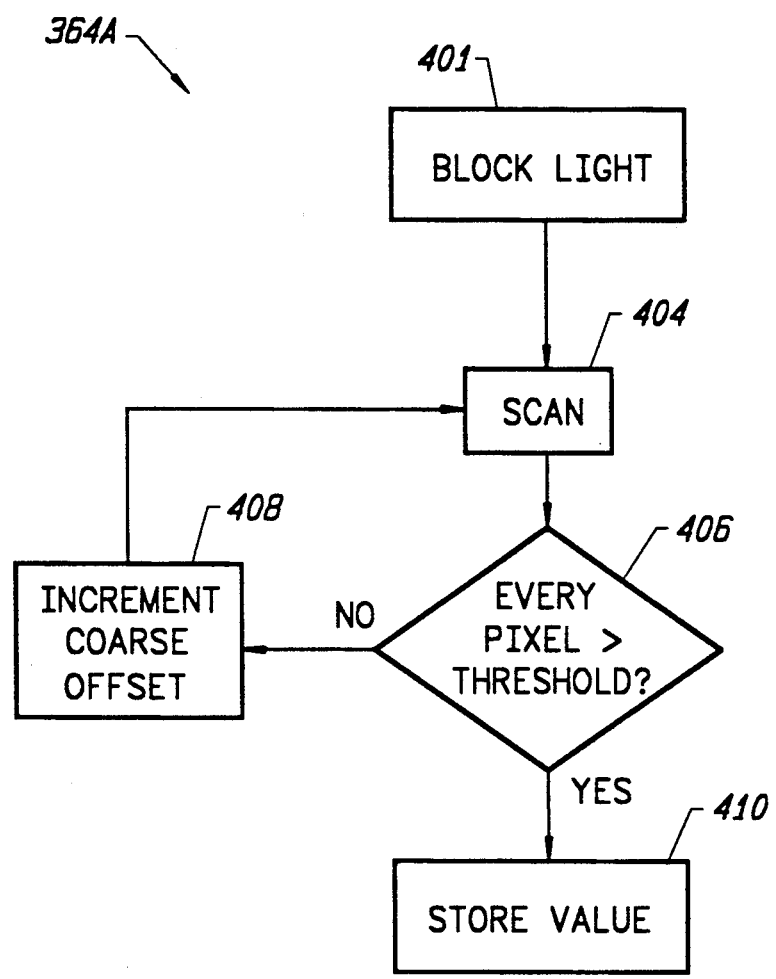
FIG. 8 is a flow diagram of the method of calculating coarse offsets, in accordance with the present invention.
Figure 9:
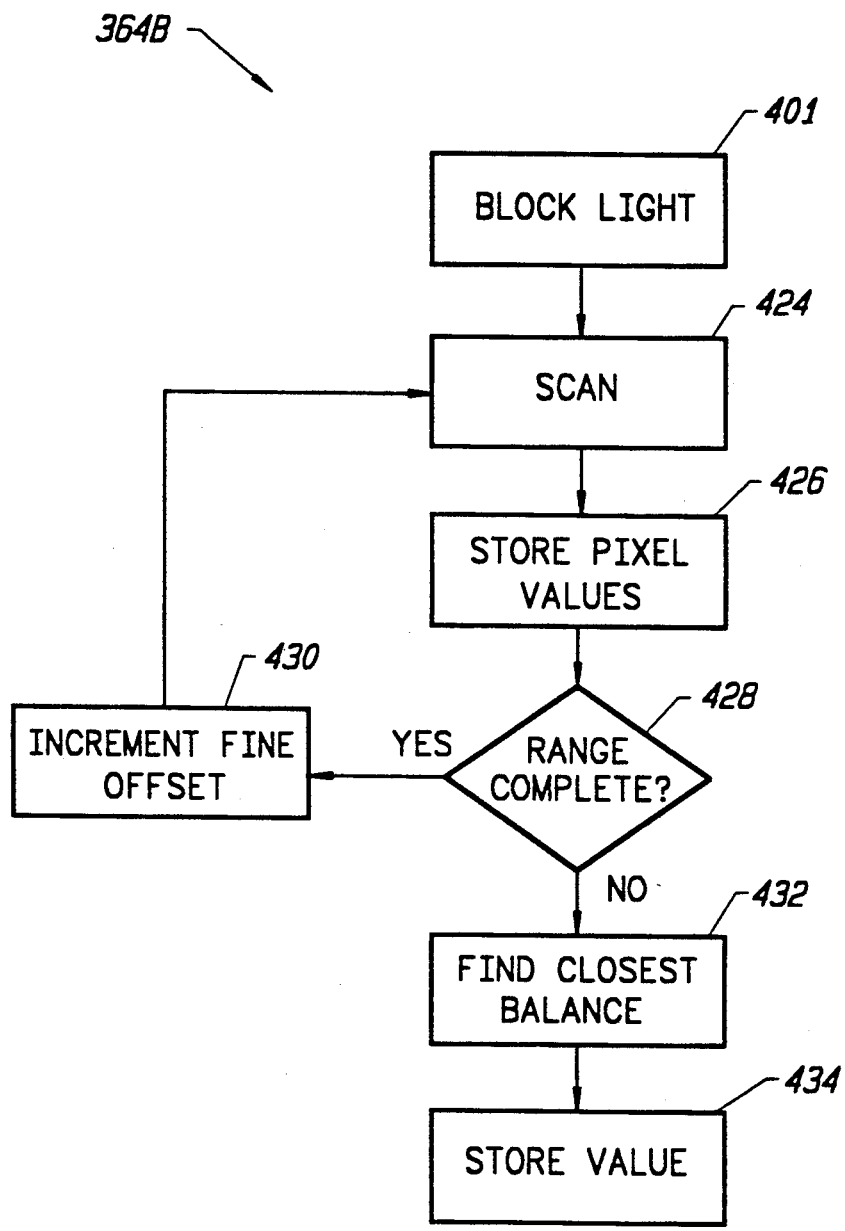
FIG. 9 is a flow diagram of the method of calculating fine offsets, in accordance with the present invention.

The procedure for calculating the offsets (block 364) is disclosed in relation to FIGS. 8 and 9. FIG. 8 discloses the method 364A for setting the coarse offset 316. The purpose of this procedure is to insure that the sensor board 74 is not clipping signals (video A 306; video B 308). FIG. 9 discloses the method 364B for setting the fine offset 318. The goal of this method is to find the closest balance between the video A 306 and video B 308 channels.

Turning to FIG. 8, light source 30 is initially blocked (block 401). Thereafter, scanning takes place (block 404). Preferably, an averaging algorithm is utilized in accordance with all scanning described in relation to the calibration method of the present invention. Specifically, a certain number of scans will be taken: 20, 100, or 1000. Through CPU board 108, these scans will be accumulated and then divided by the number of scan lines to obtain an average pixel value. Through this averaging, random noise in the data is reduced.

The scanned values are measured (block 406) to determine whether each pixel value is above a defined threshold. The threshold value is generally assigned to be zero. If clipping is present, the coarse offset 316 is incremented, as directed by CPU board 108, by approximately 50 mV (block 408). On the other hand, if no clipping is present, then the offset value is stored, via CPU board 108 (block 410).

After setting the coarse offsets 316, the fine offsets 318 are set, in accordance with FIG. 9. Again, the light is blocked (block 401). Scanning then takes place (block 424) and a pixel balance value is computed and stored (block 426). A decision is then made (decision block 428) to determine whether a predetermined range of offsets have been tested. If the range is not complete, the fine offset 318 is then incremented by approximately 4 mV (block 430). If the desired range has been tested, then all the stored pixel balance values within the range are searched to determine the closest balance between signals (block 432). This value is then stored (block 434).

Figure 10:
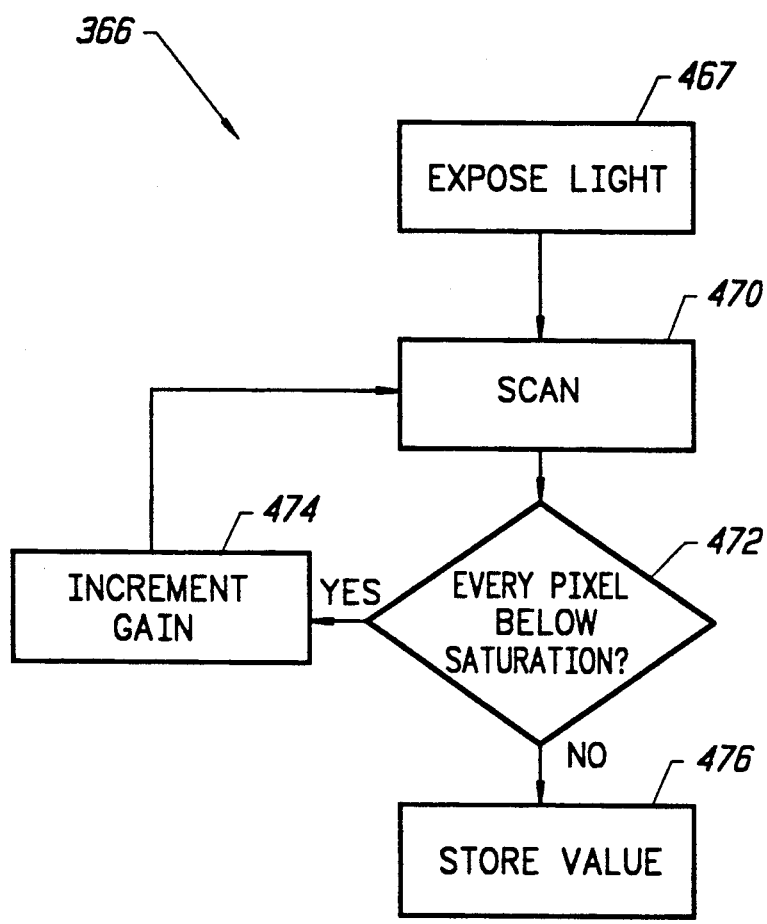
FIG. 10 is a flow diagram of the method of calculating gains, in accordance with the present invention.

The method of calculating gains 366 is disclosed in reference to FIG. 10. Gain 320 and gain 322 are set independently by setting the other gain value to zero, thereby effectively turning off the other channel. Thereafter, light source 30 is unblocked (block 467) and scanning begins (block 470). The scanned data is analyzed to determine whether every pixel is below a predefined saturation level (decision block 472). If every pixel is below saturation, the gain (video A gain 320 or video B gain 322) is incremented (block 474). If saturation is present, then the present value, or the previous non-saturated value is stored (block 476).

Figure 11:
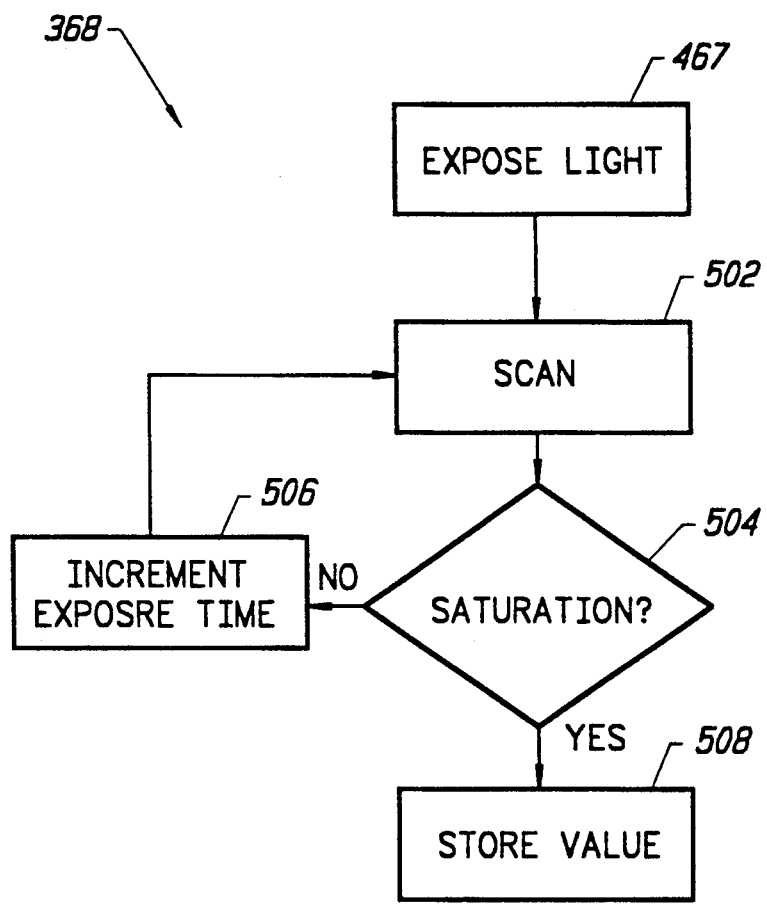
FIG. 11 is a flow diagram of the method of calculating saturation exposure, in accordance with the present invention.

The procedure for calculating saturation exposure 368 is disclosed in relation to FIG. 11. This procedure serves to define a more accurate exposure time than that nominal value previously assigned (block 362). Scanning is initiated (block 502) and data is collected from sensor board 74 and interpreted by DSP board 104 to determine whether the CCD 72 is saturated (decision block 504). This saturation level is determined by the flat response on the sensor board 74: conventional measures must be taken to insure that one is not measuring the saturation of the analog to digital converter 340. If saturation has not been reached, then the exposure time is incremented (block 506) and scanning is repeated (block 502). This procedure is repeated until a saturation level is reached and the resultant saturation value, or previous value, is stored (block 508).

The exposure time obtained in this method is used to calculate an actual exposure time to be used in further scans. However, if one were to use the actual number stored, exposure times would be too long. On the other hand, if one simply used 10% of the determined exposure time, a great deal of dynamic range would be lost. Consequently, a value of approximately 40% of the saturation time is suitable to maintain dynamic range while keeping exposure times low.

After the initial exposure times have been calculated in accordance with step 368, these times are employed in an iterative process of refining the offsets and gains, as depicted in FIG. 7. The number of iterations (decision block 370) is determined by the accuracy required by the user. Preferably, the iteration decision, made by CPU board 108, is accompanied by a direction to define whether an iteration of both offsets (block 364) and gains (block 366) is required or whether only an offset or gain requires iteration. This iterative method results in an accurately calibrated scanner 20, which is difficult to obtain in a one-pass calibration sequence.

After this iterative procedure, an analogous procedure is employed in relating to the different colors of the filter assembly 70. Initially, either the red, green, or blue filter of filter assembly 70 is positioned in the optical path (block 371). Relying upon the offset values previously established, some nominal offset value is established (block 373). Similarly, a nominal gain is established (block 375). Using these nominal values, saturation exposure, for the particular color being scanned, is determined (block 368). Based upon the resultant saturation data, offsets are calculated (block 364) and gains are calculated (block 366). Refinement of the offsets and gains is available through an iterative procedure (decision block 370), if desired. After setting the saturation, gains, and offsets for one color, then next color is invoked (decision block 371), if appropriate. If all colors have been loaded, then the calculate correction step (block 372) is invoked.

Figure 12:
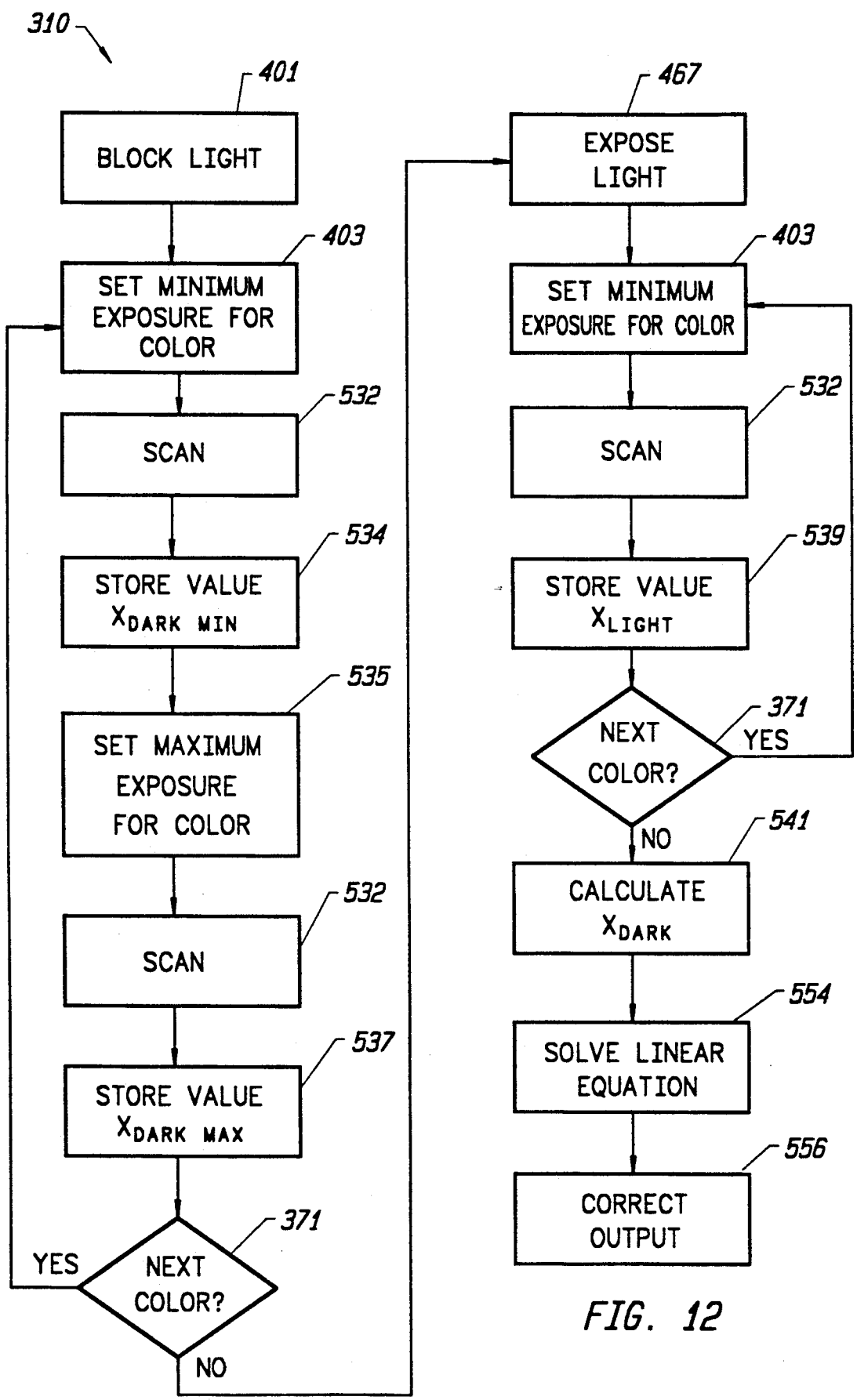
FIG. 12 is a flow diagram of the method of calculating correction, in accordance with the present invention.

The method of correction calculating (block 372) is disclosed in relation to FIG. 12. This method corrects for non-uniformities in the light source 30, the CCD 72, and sensor board 74.

First, light source 30 is blocked (block 401). A minimum exposure time for the relevant color is set (block 403). This exposure time is established by the user relying upon the saturation exposure previously determined for each color (block 368). A suitable fraction of this saturation exposure time may be used to define the minimum exposure time.

Scanning then takes place (block 532) and an $X_{darkmin}$ value is stored (block 534). A maximum exposure, as previously established (block 368), is then set (block 535), and scanning is reinitiated (block 532). The resultant $X_{darkmax}$ value is then stored (block 537). This procedure is repeated for each color with the light blocked (decision block 371).

After all colors have been tested, the light is no longer blocked (block 467). The minimum exposure for the appropriate color is set (block 403), scanning is initiated (block 532), and the resultant $X_{light}$ value is stored (block 539). This procedure is repeated until each color has been tested (decision block 371).

Once this data is accumulated, an $X_{dark}$ value may be established by interpolation. The interpolated value is an approximation of an $X_{dark}$ value for the actual exposure; this value is then used to correct the scanned data. Specifically, the following interpolation equation may be solved for $X_{dark}$:

$$(\text{Exposure}_{actual} - \text{Exposure}_{minimum})/(\text{Exposure}_{maximum} - \text{Exposure}_{minimum})$$
$$= (X_{dark} - X_{darkmin})/(X_{darkmax} - X_{darkmin})$$

$\text{Exposure}_{actual}$ is the exposure value actually used during the scan, $\text{Exposure}_{minimum}$ was established in block 403, $\text{Exposure}_{maximum}$ was established in block 535, $X_{darkmin}$ was determined at block 534, and $X_{darkmax}$ was established at block 537.

If one then sets ideal values for $X_{light}$ and $X_{dark}$ corresponding to white light (WL) and no light (NL), then the $X_{dark}$, $X_{light}$, and ideal values (WL, NL) may be incorporated into two linear equations which may be solved simultaneously:

$$WL = M * X_{light} + b$$

$$NL = M * X_{dark} + b$$

These equations may be solved by CPU board 108 for M and b (block 554). The M and b values may then be applied to correct (block 556) the data of sensor board 74 (value input), after the calibration process, during actual scanning. The corrected value (value output) may be defined as $$\text{Value}_{output} = M * \text{Value}_{input} + b$$

Thus, in accordance with this equation, a linearly corrected output will be provided at the time of scanning, for every input value.

Thus, in accordance with the present invention, a scanner 20 has been provided which realizes optimal performance through a calibration procedure of the sensor board 74. This calibration results in high quality pixel data which may be further utilized by a host computer for data manipulation, text integration, and high quality document production.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. An image scanner comprising:
    a charge coupled device for receiving an image, said charge coupled device generating a first video output signal and a second video output signal;
    a filter assembly including a plurality of color filters, said filer assembly including means for positioning a selected color filter from said plurality of color filters in front of said charge coupled device to generate a first selected color video output signal corresponding to said first video output signal and a second selected color video output signal corresponding of said second video output signal;
    means or defining a non-clipping DC bias signal, said defining means including
        means for assigning a threshold value,
        means for iteratively incrementing a temporary DC bias signal,
        means of iteratively applying said temporary DC bias signal to said first selected color video output signal and said second selected color video output signal until said first selected color video output signal is above said threshold and forms a first non-clipped video output signal and said second selected color video output signal is above said threshold and forms a second non-clipped video output signal;

means for iteratively defining a firs gain value and a second gain value;

means for adding said first gain value to said first non-clipped video output signal to provide a first non-saturated, non-clipped video output signal; and means for adding said second gain value to said second non-clipped video output signal to provide a second non-saturated, non-clipped video output signal.

2. The apparatus of claim 1 wherein said iteratively defining means includes means or setting said second gain value to zero during a first iteration period;

means for iteratively incrementing a first temporary gain value during said first iteration period until a saturated video output signal is produced at a first saturation time, said first gain value corresponding to said first temporary gain value immediately prior to said first saturation time;

means for assigning said first gain value of zero during a second iteration period; and means for iteratively increasing a second temporary gain value during said second iteration period until a saturated video output signal is produced at a second saturation time, said second gain value corresponding to said second temporary gain value immediately prior to said second saturation time.

3. The apparatus of claim 1 further comprising means for iteratively identifying a fine offset value to balance a dark level of said second selected color video output signal with a dark level of said first selected color video output signal; and means for adding said fine offset value to said second selected color video output signal.

4. The apparatus of claim 3 wherein said identifying means includes:

means for applying a plurality of temporary fine offset value to said second selected color video output signal;

means for comparing said first selected color video output signal and said second selected color video output signal for each of said plurality of temporary fine offset values to generate a corresponding plurality of comparison values; and means for selecting said fine offset value based upon said comparison values.

5. The apparatus of claim 1 further comprising:

means for combining said first non-saturated, non-clipped video output signal and said second non-saturate, non-clipped video output signal to produce an analog video output signal; and an analog-to-digital coercer for converting said analog video output signal to a digitalis video output signal.

6. The apparatus of claim 5 further comparison:

means for compensating said digital video output signal to established a compensated digital video output signal with a linear dynamic range.

7. The apparatus of claim 6 wherein said compensating means includes means for gathering a light signal value ($X_{light}$) produce by said charge coupled device when said charge coupled device is exposed to an illuminated object for a minimum exposure period;

means of interpolating a dark signal value ($X_{dark}$) produced by said charge coupled device when said charge coupled device is exposed to a dark image for a minimum exposure period;

means for defining an ideal no light value (NL);

means for designating an ideal white light value (WL); and means for simultaneously solving a white light function and a no light function for an M variable and a b variable, said white light function and said no light function being respectively defined as $$WL = M * X_{light} + b$$

$$NL = M * X_{dark} + b.$$

8. The apparatus of claim 7 wherein said compensating means further comprises means for executing a correction function defined as: CDVOS = M * DVOS + b, wherein DVOS is said digital video output signal, CDVOS is said compensated digital video output signal, M is said M variable, and b is said by variable.

9. The apparatus of claim 7 wherein said interpolating means interpolates said dark signal value ($X_{dark}$) from:

an actual exposure value (Exposure$_{actual}$) produced by said charge coupled device when said charge coupled device is exposed to an illuminated object for a predetermined exposure period;

a minimum exposure value (Exposure$_{minimum}$) produced by said charge coupled device when said charge coupled device is exposed to an illuminated object for a predetermined minimum exposure period;

an exposure maximum value (Exposure$_{maximum}$) produced by said charge coupled device when said charge coupled device is exposed to an illuminated object for a predetermined maximum exposure period;

a dark minimum value ($X_{darkmin}$) produced by said charge coupled device when said charge coupled device is exposed to a dark image for a predetermined maximum exposure period; and a dark maximum value ($X_{darkmax}$) produced by said charge coupled device when said charge coupled device is exposed to a dark image for a predetermined maximum exposure period.

10. An image scanner comprising:

a charge coupled device for receiving an time, said charge coupled device generating a firs video output signal and a second video output signal;

means or combining said firs video output signal and said second video output signal to produce an analog video output signal;

an analog-to-digital coercer for converting said analog video output signal to a digital video output signal;

means for compensating said digital video output signal to establish a compensated digital video output signal with a linear dynamic range, wherein said compensating means includes means for gathering a light signal value ($X_{light}$) produced by said charge coupled device when said charge coupled device is exposed to an illuminated object for a minimum exposure period;

means for interpolating a dark signal value ($X_{dark}$) produced by said charge coupled device when said charge coupled device is exposed to a dark image for a minimum exposure period;

means for defining an ideal no light value (NL);
means for designating an ideal white light value (WL); and
means for simultaneously solving a white light function and a no light function for an M variable and a b variable, said white light function and said no light function being respectively defined as $$WL = M * X_{light} + b$$

$$NL = M * X_{dark} + b.$$

11. The apparatus of claim 10 wherein said compensating means further comprises means for executing a correction function defined as: CDVOS = M * DVOS + b, wherein DVOS is said digital video output signal, CDVOS is said compensated digital video output signal, M is said M variable, and b is said b variable.

12. The apparatus of claim 10 wherein said interpolating means interpolates said dark signal value ($X_{dark}$) from:

an actual exposure value ($Exposure_{actual}$) produced by said charge coupled device when said charge coupled device is exposed to an illuminated object for a predetermined exposure period;

a minimum exposure value ($Exposure_{minimum}$) produced by said charge coupled device when said charge coupled device is exposed to an illuminated object for a predetermined minimum exposure period;

an exposure maximum value ($Exposure_{maximum}$) produced by said charge coupled device when said charge coupled device is exposed to an illuminated object for a predetermined maximum exposure period;

a dark minimum value ($X_{darkmin}$) produced by said charge coupled device when said charge coupled device is exposed to a dark image for a predetermined minimum exposure period; and a dark maximum value ($X_{darkmax}$) produced by said charge coupled device when said charge coupled device is exposed to a dark image for a predetermined maximum exposure period.

* * * * *